(12) United States Patent
Steinel et al.

(10) Patent No.: US 6,299,349 B1
(45) Date of Patent: Oct. 9, 2001

(54) PRESSURE AND TEMPERATURE SENSOR

(75) Inventors: Heinrich Wolfgang Steinel, Bad Wörishofen (DE); Ekkehart Nier, Sattel (CH)

(73) Assignee: Steinel AG, Einsiedeln (CH)

( * ) Notice: Subject to any disclaimer, the term of this patent is extended or adjusted under 35 U.S.C. 154(b) by 0 days.

(21) Appl. No.: 09/308,120

(22) PCT Filed: Nov. 17, 1997

(86) PCT No.: PCT/EP97/06410

§ 371 Date: May 14, 1999

§ 102(e) Date: May 14, 1999

(87) PCT Pub. No.: WO98/22787

PCT Pub. Date: May 28, 1998

(30) Foreign Application Priority Data

Nov. 15, 1996 (DE) .......................................... 296 19 778 U

(51) Int. Cl.$^7$ ................................ G01K 1/08; G01K 7/02
(52) U.S. Cl. ............................ 374/143; 73/714; 73/753; 374/179
(58) Field of Search .................................... 374/143, 139, 374/208, 135, 142, 179; 73/714, 753, 703, 708, 721, 745

(56) References Cited

U.S. PATENT DOCUMENTS

| | | | |
|---|---|---|---|
| 3,062,052 | * 11/1962 | Kolb ................................ | 374/143 |
| 3,439,356 | * 4/1969 | Kinzer .............................. | 374/143 |
| 3,605,495 | * 9/1971 | Krause et al. .................... | 374/143 |
| 4,563,902 | * 1/1986 | Kohnlecher ....................... | 374/143 |
| 4,765,751 | * 8/1988 | Pannone et al. .................. | 374/143 |
| 4,788,871 | * 12/1988 | Nelson et al. .................... | 374/143 |
| 4,797,007 | * 1/1989 | Elmore, III ....................... | 374/143 |
| 4,984,905 | * 1/1991 | Amano et al. .................... | 374/143 |
| 5,163,321 | * 11/1992 | Perales ............................. | 374/143 |
| 5,231,880 | * 8/1993 | Ward et al. ....................... | 374/143 |
| 5,315,876 | * 5/1994 | Glassey et al. ................... | 374/143 |
| 5,385,200 | * 1/1995 | Yuki et al. ........................ | 164/457 |
| 5,578,993 | * 11/1996 | Sitabkhan ......................... | 374/143 |
| 5,702,592 | * 12/1997 | Suri et al. ......................... | 374/143 |
| 5,975,842 | * 11/1999 | Jensen et al. ..................... | 374/143 |
| 6,062,087 | * 5/2000 | Vovan ................................ | 73/726 |
| 6,090,318 | * 7/2000 | Bader et al. ...................... | 264/40.1 |
| 6,147,437 | * 11/2000 | Matsumoto et al. .............. | 310/338 |

FOREIGN PATENT DOCUMENTS

| | | | |
|---|---|---|---|
| 0845400 | * 9/1989 | (CA) ................................ | 374/143 |
| 40 10 609 A1 | 10/1990 | (DE) . | |
| 42 25 879 A1 | 2/1993 | (DE) . | |
| 2182775 | * 5/1987 | (GB) ................................ | 374/143 |
| 11077780 | * 3/1999 | (JP) . | |
| 0932311 | * 5/1982 | (SU) ................................ | 374/143 |
| 1509650 | * 9/1989 | (SU) ................................ | 374/143 |

OTHER PUBLICATIONS

*Ein Sensor für Druck und Temperatur*, Messtechnik, Elektronik 16/Aug. 7, 1987, XP–002058653.

* cited by examiner

*Primary Examiner*—Diego Gutierrez
*Assistant Examiner*—Gail Verbitsky
(74) *Attorney, Agent, or Firm*—Carter & Schnedler, P.A.

(57) ABSTRACT

The invention pertains to a pressure and temperature sensor, in particular for determining a pressure and temperature condition in a cavity of an injection molding apparatus or the like having a pressure body which co-operates with a sensor housing and which in a mounted condition can be acted upon by a pressure in the cavity and which is intended for transmitting the pressure to a piezoelectrically acting sensor arrangement, wherein an electrical signal generated by the sensor arrangement as a reaction to the pressure is taken out of the sensor housing by means of an electrical contact device, wherein a thermoelectric detector element is fitted in the pressure body and an electrical temperature signal generated by the detector element is taken out by way of the electrical contact device.

12 Claims, 2 Drawing Sheets

PRESSURE AND TEMPERATURE SENSOR

Figure 1:
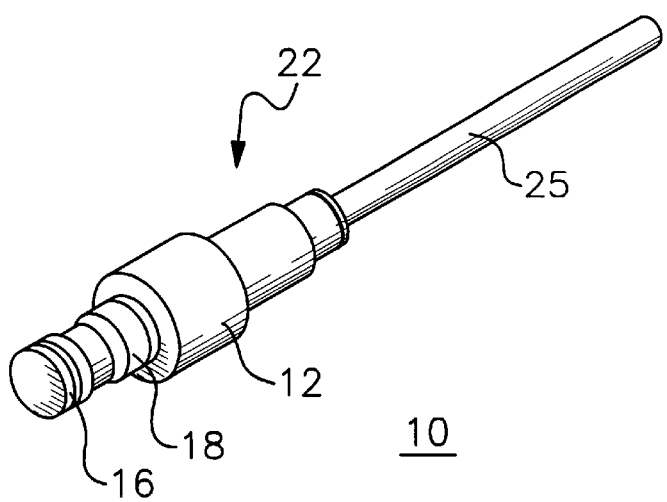

The invention concerns a pressure and temperature sensor, in particular for detecting a pressure and temperature condition in a cavity of an injection molding apparatus or the like.

Sensors of that kind are used in particular when measuring the internal pressure in a tool in an injection molding apparatus, the pressure of molten material in pressure chambers of a corresponding installation being directly or indirectly detected.

During such an injection molding procedure an internal pressure pattern which is dependent on a respective state in the process obtains in the pressure chamber (cavity)—from a sharp rise after the beginning of the injection procedure by way of a more or less shallow pressure drop during the post-pressure phase down to atmospheric pressure. In that respect in particular parameters of a plastic material to be injected, the injection rate or the temperature conditions in the interior influence the configuration of that curve. Therefore, it is precisely in relation to high-precision parts that accurate reproducible measurement of the pressure conditions in an injection molding pressure cavity is an important consideration in order to be able to aid and support the complex control procedures which are necessary to achieve an optimum result.

In that respect it has been found desirable to be able to measure the temperature in the internal cavity, in addition to the pressure therein. More specifically, such an additional parameter would then make it possible to support and aid in particular still further control procedures which are pressure-neutral and to that extent cannot be monitored and controlled by pressure measurement alone.

It is known in that respect for temperature detection to be additionally provided in the internal cavity in locally separate relationship from a conventional pressure sensor in order to acquire that further control parameter.

Besides the mechanical and structural complication and expenditure which is inevitably necessary for that purpose (thus for example a second access would have to be provided to the pressure chamber), pressure and temperature measurement values from such an arrangement also mean that the temperature is measured at a different location from a respective pressure. Particularly in the event of severely non-homogenous conditions in the internal space therefore there can potentially be incorrect measurements and, as a result thereof, malfunctions.

Therefore the object of the present invention, in particular for parameter detection in an internal space of injection molding apparatuses, is to provide a sensor of the general kind set forth for pressure and temperature detection, which is also easily suitable at low cost for conventionally existing injection molding apparatuses that are only designed for pressure measurement, and which permits locally interrelated pressure and temperature measurement.

Advantageously, the thermoelectric detector element which is directly fitted into the pressure body permits local detection of the temperature directly at the location of pressure measurement without additional precautions having to be taken in the pressure chamber or for example without the diameter of a sensor having to be increased. The invention also advantageously provides that arranging for temperature detection in the pressure body itself and thus in the immediate vicinity of the temperature source means that it is possible to implement quickly reacting, short-time temperature detection which is necessary in particular for process operations which themselves are relatively short.

Advantageous developments of the invention are claimed in the appendant claims.

Thus in a particularly preferred feature the pressure body is of a circular cross-section and is dimensioned for use in openings of a diameter for example of 4 mm, which are already present for conventional pressure sensors. That makes it possible for existing injection molding installations to be converted in a particularly simple fashion.

It has also proven to be advantageous to use flat crystal elements in the form of wafers as detector elements as that makes it possible to optimize the electrical pressure signal.

Choosing the thermoelectric sensor element in the form of a casing or jacket-type thermocouple element also permits complete capacitive screening which is appropriate in particular in regard to the adjacent pressure detection.

In accordance with a preferred development moreover the thermocouple element is designed to be exposed in the pressure-application surface. That makes it possible further to minimize the thermal response time.

In order to provide for contact-sure contacting which is however nonetheless simple to produce in respect of a pressure and temperature sensor according to the invention, it is particularly appropriate for the contact device to be in the form of a coaxial plug connection, in which case it can preferably also be of multi-shell structure—corresponding to the number of electrical poles to be taken out of same—, or a shell of a plurality of poles is used for contacting purposes.

Figure 3:
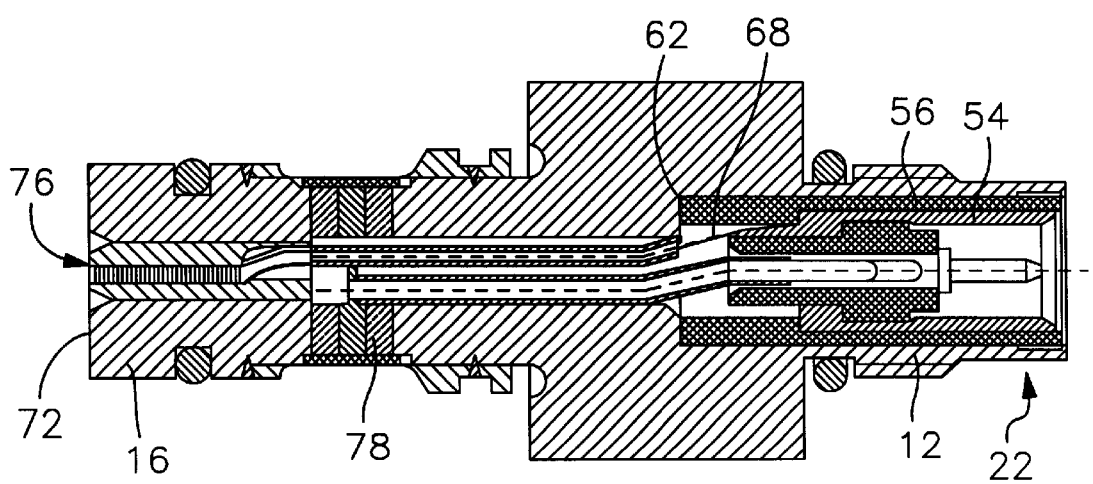
Figure 2:
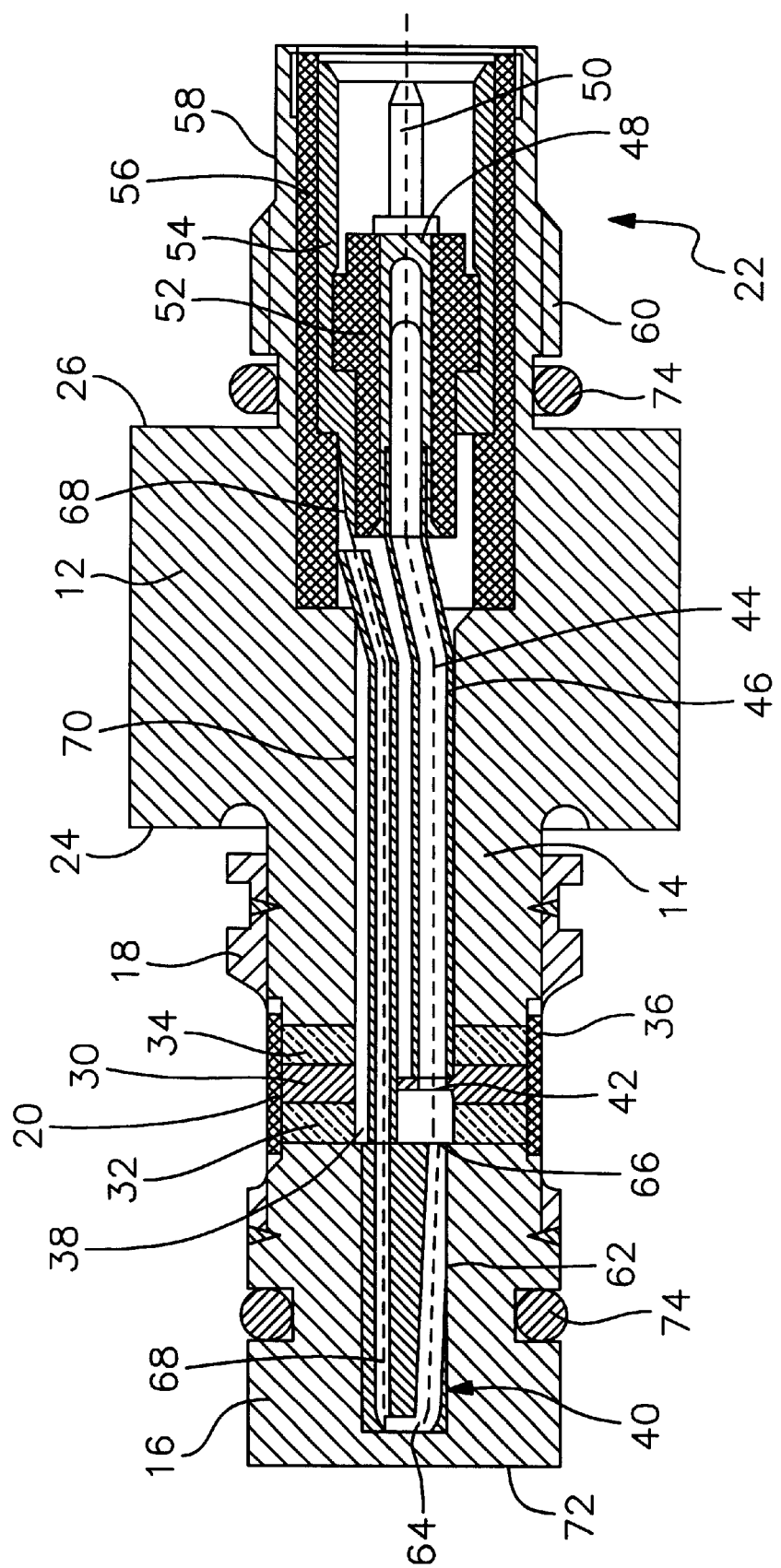

Further advantages, features and details of the invention will be apparent from the description hereinafter of embodiments by way of example and with reference to the drawing in which:

FIG. 1 shows a perspective view of the pressure and temperature sensor according to the invention, FIG. 2 is a view in axial section through the pressure and temperature sensor according to the invention in a first embodiment, and FIG. 3 is a view in axial section through the pressure and temperature sensor according to the invention in a second alternative embodiment of the invention.

The sensor 10 which is intended in particular as an internal pressure and temperature sensor for direct measurement of the pressure of molten material in an injection or casting tool has a cylindrical sensor housing 12 of steel, which at the pressure side co-operates with a cylindrical pressure rod body or plunger 16 as a pressure element. The rod 16 which in the illustrated embodiment by way of example is about 4 mm in outside diameter is compressively elastically connected to the sensor housing 12 by way of a steel prestressing sleeve 18 which engages over a projection 14 and in its central region has a thin deformation location 20 which permits elastic deformation.

A plug portion 22 is provided at the end of the sensor housing 12, which is opposite to the pressure rod 16.

The sensor arrangement 10 is fixed to the cavity or to the desired location in the injection space by means of a union nut (not shown in the drawing) or the like fixing member—with a front annular shoulder 24 and a rearward annular shoulder 26 respectively on the housing 12 as support means.

A feed conduit 25 which is taken out rearwardly (with respect to the pressure direction) leads electrical connections of the detection elements provided in the sensor unit to an electronic detection and evaluation unit (not shown) which can be connected thereto.

As shown in detail in FIG. 2 the transitional region between the pressure rod 16 and the housing projection 14 on the sensor housing, the transitional region being enclosed by the deformation location 20 of the sleeve 18, comprises an arrangement of various plate-shaped elements which extend substantially radially symmetrically about a longitudinal axis through the sensor arrangement: a contact plate portion 30 of conducting material is delimited on both sides by first and second quartz wafers 32 and 34 respectively so that the mutually facing surfaces of the quartz wafers 32, 34 respectively contact the central contact plate portion 30 while the respective mutually remote sides of the quartz wafers 32, 34 electrically conductingly contact the pressure rod 16 and the housing projection 14 on the sensor housing 12.

A sheath-shaped insulating ring 36 of Teflon material or ceramic encloses the arrangement formed from the first quartz wafer 32, the contact plate portion 30 and the second quartz wafer 34 and thus forms insulation relative to the surrounding sleeve 18.

The arrangement of the first quartz wafer 32, the contact plate portion 30 and the second quartz wafer 34 also has a central opening 38 for signal lines—which are to be described in greater detail hereinafter—for the thermocouple element 40 arranged in the pressure rod 16 to be passed therethrough.

In that way an electrically conducting ground connection can then be made between the rod 16 and the housing 12 by way of the metal sleeve 18; at the same time, the action of the insulating sheath 36 of insulating material provides for insulating both the contact plate portion 30 and also each peripheral surface of the quartz wafers 32, 34 with respect to that ground potential.

Such an arrangement affords an electrical parallel connection of the two quartz wafers 32, 34, wherein the contact plate portion 30—connected to the respective, mutually facing surfaces of the quartz wafers—acts in that respect as a common signal contact for charges which are to be generated by the quartz wafers 32, 34, while the respective mutually remote sides of the quartz wafers are connected in parallel relationship to ground.

The contact or signal plate portion 30 is connected by way of a contact connection or terminal 42 to a pressure signal line 44 which in turn has an electrical insulating sheath (insulating tube) 46.

The electrical pressure signal line 44 is taken as far as a receiving means 48 for a contact needle 50 in the plug portion 22 and is connected thereto so that the contact needle 50 carries the electrical potential which occurs at the signal plate portion 30.

The receiving means 48 for the contact needle 50 is surrounded in the interior of the plug by an insulating sleeve 52 of Teflon (alternatively: for example ceramic) which in turn is peripherally surrounded in positively locking relationship by a cylindrical contact sleeve 54. A further, outer insulating sleeve 56 which encloses the arrangement formed by the contact needle receiving means 48, the inner insulating sleeve 52 and the cylindrical contact sleeve 54 is then fitted at its peripheral side into a suitable longitudinal bore in the sensor housing 12. At the peripheral side the outer insulating sleeve 56 is surrounded in the region of the plug portion 22 by a plug edge 58 which is formed integrally with the sensor housing 12 and which over a part of its peripheral surface has a male screwthread portion 60.

In that way, provided on the plug side is a rotationally symmetrical, multi-shell plug structure which from the outside inwardly has a ground connection (plug edge 58), an insulation (outer sleeve 56), a contact sleeve for the temperature signal (sleeve 54) and a central contact needle 50 for the pressure signal. Jointly with pressure detection, the second pole of the thermocouple element is also taken by way of the common ground.

To describe this in greater detail, the thermocouple element 40 which is accommodated in the pressure rod 16 has a first thermoelectric wire (diagrammatically indicated by reference 62) which is taken from an end connecting location 64 to a ground contact 66 at the inner end of the pressure rod 16. A second thermoelectric wire 68 extends from the connecting location 64 substantially axially through the pressure rod 16, through the opening 38 formed in the arrangement 32, 30, 34 and through the sensor housing 12 to the plug portion 22 where an electrical connection is made between the second thermoelectric wire 68 and the cylindrical contact sleeve 54 (by clamping between the sleeve 54 and the surrounding insulating sleeve 56). In that arrangement, the second thermoelectric wire 68 is sheathed by an electrical insulation 70, over practically its entire length.

As shown in FIG. 2, the thermocouple element 40 is arranged in the rod region 16 in such a way that the connecting location 64 of the thermocouple element is at a spacing from the outside wall 72 (which in the assembled condition contacts the temperature or pressure medium respectively) of the pressure rod 16. The thermocouple element 40 is also relieved of pressure in a direction towards the disk arrangement 32, 30, 34 through the opening 38 which is of a slightly larger diameter than the thermocouple element.

O-rings 74 provided on the housing 12 and on the rod 16 respectively then also serve for adaptation and mechanical sealing.

For practical use, pressure and temperature sensors (also referred to as pT-sensors) are fixed to the pressure space for example of an injection molding machine—for example in the cylinder head or to a hot channel or runner—in such a way that the outside wall 72 of the pressure rod 16 extends into the respective pressure space or is aligned with a pressure space wall.

During an injection molding procedure varying pressure conditions will then occur at the injection tool, as a functional pattern which is time-dependent, in which respect it is particularly important to detect the pressure phases "injection" and "dwell pressure" and to use them as input parameters for pressure control purposes.

At the same time, a positionally accurate temperature signal is available by virtue of the output signal of the thermocouple element 40. That temperature signal furnishes a respective temperature value in the pressure space or chamber—at the same location as the pressure measurement—as a supplementary parameter for the process control operation. In practical use pressures of up to about 2000 bars can occur at temperatures of between 250 and 400° C. in the case of plastic material injection molding procedures. In that respect, the illustrated arrangement not only permits precise measurement value detection with short reaction times (when using a jacket or casing type thermocouple element, only a few ms response time) under the extreme conditions indicated; in addition the compact arrangement of temperature detection in the pressure body itself makes it possible to use previous openings or mountings for conventional pressure sensors (for example for the diameter of 4 mm), without the need for separately taking precautions or implementing conversion steps for additional temperature measurement.

Practical use of the pressure and temperature sensor according to the invention also exhibits excellent properties in regard to reproducibility of the pressure and temperature values so that the invention is particularly suitable for demanding and complex control applications. Not least the additional temperature detection, for example at the injection channel or runner, permits substantially more precise process control which for example also embraces material specifics, with optimum local accuracy and local coincidence of pressure and temperature values.

FIG. 3 shows a slightly modified, alternative embodiment for the temperature and pressure sensor of FIG. 2.

While the thermocouple element of FIG. 2, in relation to the outside wall 72 pressure-application surface at the pressure side, is arranged concealed in the pressure rod 16. FIG. 3 shows an embodiment with a jacket or casing thermocouple element 76 which extends into a pressure space or chamber, by virtue of being fitted into the outside wall 72 at the front, welding and grinding away to be flush with the outside wall.

Furthermore, in the embodiment of FIG. 3, the pole on the ground side of the thermocouple element (thermoelectric wire 62) is not contacted in the region of the pressure rod 16 and thus taken to ground, but together with the signal-carrying second thermoelectric wire 68 it is taken through a capacitively screening guide 78 to the plug portion 22. There the second thermoelectric wire 68 is then connected to the cylindrical contact sleeve 54 in the manner already described above while the ground feed of the thermocouple element 76 only acquires a ground connection in the region of the plug portion 22 by virtue of being clamped between the outer insulating sleeve 56 and the sensor housing 12.

In particular the embodiment of FIG. 3 therefore affords a construction which enjoys better capacitive screening and which advantageously protects the high-resistance pressure signal from interference influences.

The thermocouple element described with reference to FIG. 3 involves an Ni/NiCr-casing thermocouple element with a screening metal casing 78 which is passed in the manner shown in FIG. 3 through the rod 16 and the housing 12 respectively to the plug portion.

While moreover in the described embodiment shown in FIG. 3, one pole of the casing-type thermocouple element is grounded, in accordance with a further alternative embodiment (not shown) it is possible for the two poles of the casing-type thermocouple element to be afforded separately in order not to involve a damaging voltage drop and to be able to effect more precise evaluation of the thermoelectric voltage between the thermoelectric wires themselves. Such a configuration could be for example such that the cylindrical contact sleeve 54 carrying the thermoelectric signal could be divided into a two-pole configuration in the peripheral direction and a respective contact portion produced in that way could be connected to an associated pole of the thermocouple element. A suitably externally communicating plug would then be able to take off both thermocouple element feed lines, independently of ground.

While the above-described embodiments have preferably used a casing-type thermocouple element as the temperature sensor, in principle other sensors are also suitable, for temperature detection in the pressure rod itself and for producing a signal which is to be appropriately electrically taken off, besides the pressure signal.

The pressure sensor arrangement is also not limited to the described embodiment; it would also be possible for example to use a plurality of modules of piezoelectric disks or wafers—for example 6 or 10—or a fundamentally different pressure detection principle.

The present invention is also not limited to the coaxial connection configuration illustrated in the described embodiments; on the contrary it is a matter for the discretion of the man skilled in the art according to the requirements involved to implement a suitable plug construction and design which affords both simple manufacture and connection and also contact security and screening.

What is claimed is:

1. A pressure and temperature sensor for detecting a pressure and temperature condition in a cavity, comprising a pressure body (16) which co-operates with a sensor housing (12) and which in a mounted condition can be acted upon by a pressure in the cavity and which is intended for transmitting the pressure to a piezoelectrically acting sensor arrangement (30, 32, 34), wherein an electrical signal produced by the sensor arrangement (30, 32, 34) as a reaction to the pressure is passed out of the sensor housing (12) by means of an electrical contact device (48, 50, 52, 54, 56, 58), characterized in that a thermoelectric detector element (40) is fitted in the pressure body (16) and an electrical temperature signal produced by the detector element (40) is passed out by way of the electrical contact device (48, 50, 52, 54, 56, 58); said thermoelectric detector element (40) is located adjacent to said sensor arrangement (30, 32, 34) in said pressure body (16) such that the temperature can be measured at substantially the same location where pressure is measured.

2. A sensor as set forth in claim 1 characterised in that the pressure body is in the form of a substantially cylindrical pressure rod.

3. A sensor as set forth in claim 2 characterised in that the pressure rod is of an outside diameter of about 4 mm.

4. A sensor as set forth in claim 3 characterised in that the sensor arrangement has at least one piezoelectric crystal wafer which co-operates by way of a flat side with the pressure body (16).

5. A sensor as set forth in claim 4 characterised in that the thermoelectric detector element is in the form of an elongate casing thermoelectric element.

6. A sensor as set forth in claim 5 characterised in that the pressure body (16) includes a pressure-application surface (72); one end of the thermoelectric detector element is exposed in said pressure-application surface (72) substantially flush therewith.

7. A sensor as set forth in claim 6 characterised in that the thermoelectric detector element has a capacitive screening which is operative in relation to the pressure body (16), the sensor arrangement (30, 32, 34) and the sensor housing (12).

8. A sensor as set forth in claim 7 characterised in that a feed line for the thermoelectric detector element is passed through an opening formed substantially centrally in the sensor arrangement.

9. A sensor as set forth in claim 8 characterised in that the electrical contact device is in the form of a plug with at least one coaxial contact sleeve at the side of the sensor housing which is opposite to the pressure body.

10. A sensor as set forth in claim 9 characterised in that electrical connections of the thermoelectric detector element are passed out ground-free and separatedly by way of the electrical contact device.

11. A sensor as set forth in claim 10 characterised in that said thermoelectric detector element includes two thermoelectric wires (62, 68); said two thermoelectric wires (62, 68) of said thermoelectric detector element are passed out in the form of contact surfaces of a common contact sleeve of the contact device.

12. A pressure and temperature sensor for detecting a pressure and temperature condition in a cavity comprising a pressure body (16) which co-operates with a sensor housing

(12) and which in a mounted condition can be acted upon by a pressure in the cavity and which is intended for transmitting the pressure to a piezoelectrically acting sensor arrangement (30, 32, 34), wherein an electrical signal produced by the sensor arrangement (30, 32, 34) as a reaction to the pressure is passed out of the sensor housing (12) by means of an electrical contact device (48, 50, 52, 54, 56, 58), and wherein a thermoelectric detector element (40) is fitted in the pressure body (16) and an electrical temperature signal produced by the detector element (40) is passed out by way of the electrical contact device (48, 50, 52, 54, 56, 58), characterised in that a transitional region comprising the sensor arrangement, between the pressure body (16) and a housing projection of the sensor housing, is enclosed by a sleeve (18); means for connecting the pressure body (16) to the sensor housing in a pressure resilient manner.

* * * * *